United States Patent
Flick

(10) Patent No.: US 7,729,814 B2
(45) Date of Patent: Jun. 1, 2010

(54) VEHICLE CONTROL SYSTEM AND ASSOCIATED METHOD FOR COUNTERACTING ROGUE COMMAND

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 1100 days.

(21) Appl. No.: 11/000,160

(22) Filed: Nov. 30, 2004

(65) Prior Publication Data

US 2006/0129282 A1 Jun. 15, 2006

(51) Int. Cl.
*G06F 17/00* (2006.01)
*B60R 25/10* (2006.01)

(52) U.S. Cl. .............. 701/2; 701/1; 340/426.1; 340/426.13; 340/426.14; 340/426.15; 340/426.16; 340/426.17; 340/426.27; 340/426.28; 340/429.29; 340/426.3; 340/426.31; 340/426.32; 340/426.33; 340/426.34; 340/426.35; 340/426.36

(58) Field of Classification Search ............ 701/1, 701/2; 340/426.1, 426.13, 426.24, 426.14–426.17, 340/426.27–426.36; 307/10.2
See application file for complete search history.

(56) References Cited

U.S. PATENT DOCUMENTS

| | | | | |
|---|---|---|---|---|
| 5,448,479 A | | 9/1995 | Kemner et al. | 364/424.02 |
| 5,559,491 A | * | 9/1996 | Stadler | 340/426.25 |
| 5,583,479 A | | 12/1996 | Hettich et al. | 340/426 |
| 5,612,578 A | | 3/1997 | Drew | 307/10.5 |
| 5,719,551 A | | 2/1998 | Flick | 340/426 |
| 5,726,541 A | | 3/1998 | Glenn et al. | 318/16 |
| 5,729,191 A | * | 3/1998 | Allen et al. | 340/426.17 |
| 5,757,086 A | * | 5/1998 | Nagashima | 307/10.6 |
| 5,818,330 A | * | 10/1998 | Schweiger | 340/426.13 |
| 5,864,297 A | | 1/1999 | Sollestre et al. | 340/825.31 |
| 5,927,240 A | | 7/1999 | Mixon | 123/179.3 |
| 6,011,460 A | * | 1/2000 | Flick | 340/426.25 |
| 6,028,505 A | * | 2/2000 | Drori | 340/426.17 |
| 6,091,340 A | * | 7/2000 | Lee et al. | 340/5.6 |
| 6,232,873 B1 | | 5/2001 | Dilz et al. | 340/426 |
| 6,275,147 B1 | | 8/2001 | Flick | 340/426 |
| 6,346,876 B1 | * | 2/2002 | Flick | 340/426.13 |
| 6,366,198 B1 | * | 4/2002 | Allen et al. | 340/426.17 |
| 6,392,534 B1 | * | 5/2002 | Flick | 340/426.17 |
| 6,542,076 B1 | * | 4/2003 | Joao | 340/539.14 |
| 6,563,421 B1 | * | 5/2003 | Wheeler | 340/539.14 |
| 6,639,511 B2 | * | 10/2003 | Haruna et al. | 340/426.13 |
| 6,756,885 B1 | | 6/2004 | Flick | 340/426.1 |
| 6,756,886 B2 | | 6/2004 | Flick | 340/426.1 |

(Continued)

*Primary Examiner*—Jack W. Keith
*Assistant Examiner*—Chuong P Nguyen
(74) *Attorney, Agent, or Firm*—Allen, Dyer, Doppelt, Milbrath & Gilchrist, P.A.

(57) ABSTRACT

A vehicle control system is for a vehicle including a data communications bus extending throughout the vehicle, and at least one vehicle device connected to the data communications bus. The vehicle control system includes a a true controller at the vehicle for controlling the vehicle device via a true command on the data communications bus. The true controller also controls the vehicle device via a respective counteracting command on the data communications bus based upon detecting a rogue controller attempt to control the at least one vehicle device via a rogue command on the data communications bus. The true controller may thus counteract a rogue controller attempt to start the engine, unlock vehicle doors, roll down windows, and/or disarm the vehicle security system, for example.

34 Claims, 4 Drawing Sheets

U.S. PATENT DOCUMENTS

| | | | |
|---|---|---|---|
| 6,771,167 B1 * | 8/2004 | Flick | 340/426.21 |
| 6,809,636 B2 | 10/2004 | Metlitzky et al. | 340/426.11 |
| 6,812,829 B1 | 11/2004 | Flick | 340/426.13 |
| 6,822,559 B2 | 11/2004 | Hofbeck et al. | 340/426.1 |

* cited by examiner

VEHICLE CONTROL SYSTEM AND ASSOCIATED METHOD FOR COUNTERACTING ROGUE COMMAND

FIELD OF THE INVENTION

The invention relates to the field of vehicle control, and, more particularly, to vehicle control over a data bus.

BACKGROUND OF THE INVENTION

A remote vehicle control system may be used to permit a user control of one or more vehicle devices from a distance. A typical remote vehicle control system, for example, in a more modern vehicle may include a controller connected to a plurality of vehicle devices via a data communications bus, and a remote transmitter providing the controller with remote control signals. The vehicle devices, for example, may operate the engine starter, the door locks, the power windows, or the alarm system.

An example of such a system is U.S. Pat. No. 5,719,551 to Flick, which discloses a remote transmitter that can remotely control a number of vehicle devices. The controller in the Flick '551 patent is responsive to the remote transmitter and sends command codes over a data communications bus to the vehicle devices. Similarly, U.S. Pat. Nos. 6,275,147, 6,756,885, 6,756,886, and 6,812,829, to Flick also disclose a controller/transmitter used to remotely control a number of vehicle devices via command codes sent over a communications data bus.

U.S. Pat. No. 5,583,479 to Hettich et al. also discloses a vehicle controller connected to a number of vehicle devices via a data communications bus and a remote transmitter in communication with the controller. The Hettich et al. patent further discloses that if the alarm system is not deactivated correctly, then the vehicle devices will be impaired or prevented from working properly.

U.S. Pat. No. 6,232,873 to Dilz et al. discloses a vehicle security system that detects if an original control unit is no longer active. If the security system determines that the original control unit is no longer active, an alternate circuit that remains active in the vehicle activates an electronic immobilization system.

Although conventional remote vehicle control systems operating via the data communications bus have made significant advances in convenience for the user, the overall security may still be an issue. For example, a would-be thief gaining access to the data bus, such as from under the vehicle, may generate rogue commands on the data bus compromising vehicle security. The would-be thief could temporarily connect a rogue controller to the data bus and cause the windows to roll down or the doors to unlock. Once inside the vehicle, the would-be thief could again connect to the data communications bus and start the engine. Of course, if the vehicle had a vehicle security system, the would-be thief could disarm the vehicle security system via the data communications bus.

SUMMARY OF THE INVENTION

In view of the foregoing background, it is therefore an object of the invention to provide a vehicle control system and associated method with both convenience and security features.

This and other objects, features, and advantages in accordance with the invention are provided by a vehicle control system for a vehicle including a true controller that can detect and counteract a rogue controller. The vehicle may include a data communications bus extending throughout the vehicle, and at least one vehicle device connected to the data communications bus. The vehicle control system may include a true controller at the vehicle for controlling the at least one vehicle device via a true command on the data communications bus. The true controller may also control the vehicle device via a respective counteracting command on the data communications bus based upon detecting a rogue controller attempt to control the vehicle device via a rogue command on the data communications bus. In some embodiments, the counteracting command may also render inoperable the at least one vehicle device for a period of time. Accordingly, the invention provides a vehicle control system with advanced security features.

The true command may include a sequence of true command codes, and the rogue command may include a sequence of rogue command codes. The true controller may detect the rogue controller attempt based upon at least one difference between the sequence of true command codes and the sequence of rogue command codes. In some embodiments, the true controller may detect the rogue controller attempt based upon a difference in timing between the sequence of true command codes, and the sequence of rogue command codes. While in other embodiments, the true controller may detect the rogue controller attempt based upon a difference in content between the sequence of true command codes and the sequence of rogue command codes.

The at least one vehicle device may be associated with engine starting, and the true controller may generate an engine shutdown command as the counteracting command. In some embodiments, the vehicle may further comprise an engine speed sensor, and the true controller may cooperate with the engine speed sensor to detect the rogue controller attempt. The vehicle may further comprise an ignition switch sensor, and the true controller may cooperate with the ignition switch sensor to detect the rogue controller attempt.

The at least one vehicle device may be associated with vehicle door lock actuation, and the true controller may generate a door lock command as the counteracting command. Alternately or additionally, the at least one vehicle device may be associated with vehicle window actuation, and the true controller may generate a window roll-up command as the counteracting command.

The at least one vehicle device may be associated with vehicle security, and the true controller may generate a re-arm vehicle security command as the counteracting command. The true controller may also include a processor, for example.

A method aspect of the invention is for using a vehicle control system for a vehicle. The vehicle may include a data communications bus extending throughout the vehicle, a true controller connected to the data communications bus, and at least one vehicle device connected to the data communications bus. The method may include controlling the at least one vehicle device via a true command on the data communications bus. The method may further include controlling the at least one vehicle device via a respective counteracting command on the data communications bus based upon detecting a rogue controller attempt to control the at least one vehicle device via a rogue command on the data communications bus.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In addition, like numbers are used to refer to like elements throughout the drawings.

Figure 1:
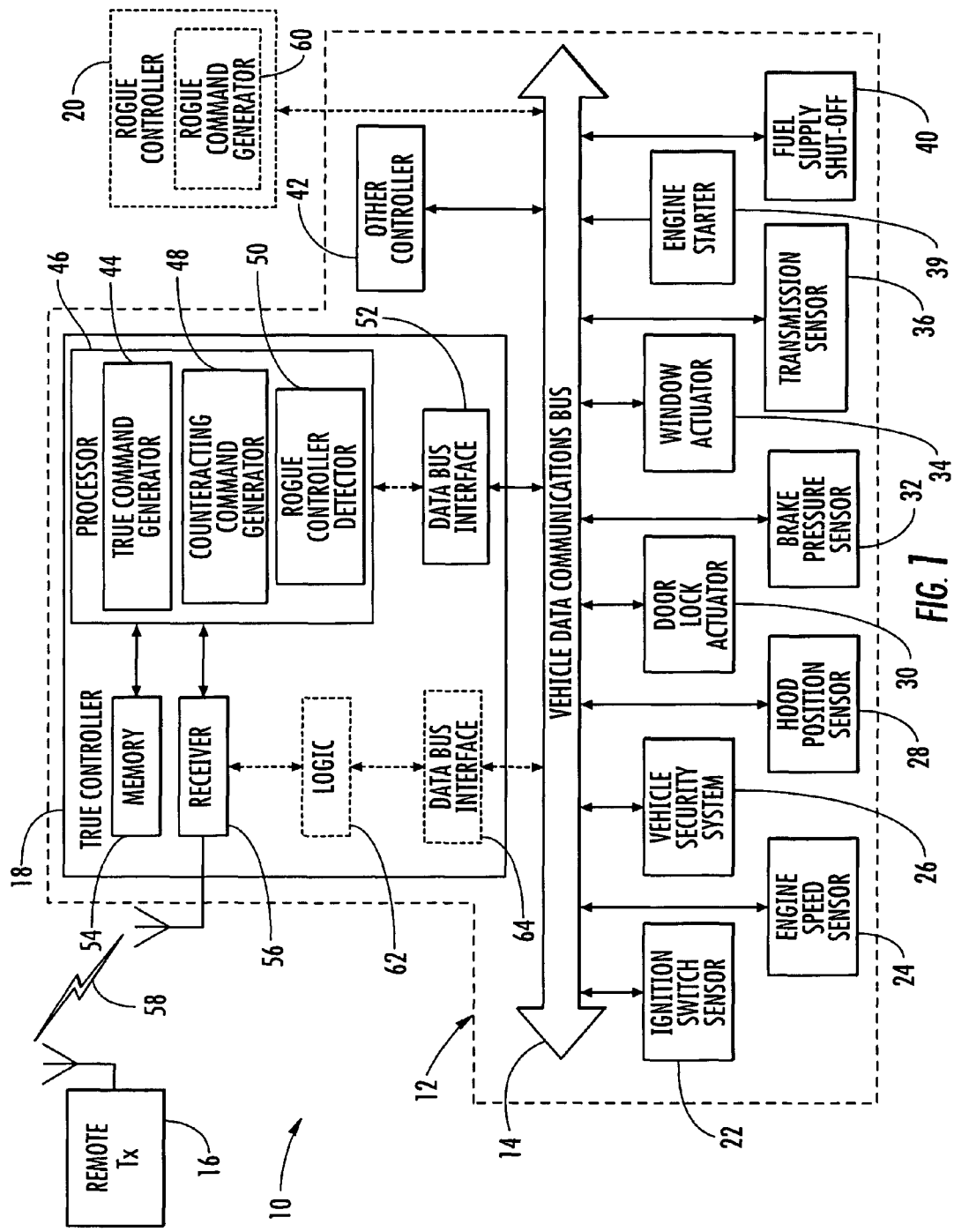
FIG. 1 is a schematic diagram of a vehicle control system in accordance with invention.

Referring initially to FIG. 1, a vehicle control system 10 for a vehicle 12 is now described. The vehicle 12 includes, for example, a data communications bus 14 extending throughout the vehicle, and at least one vehicle device connected to the data communications bus. In the illustrated embodiment, the at least one vehicle device includes an ignition switch 22, an engine speed sensor 24, a vehicle security system 26, a hood position sensor 28, a door lock actuator 30, a brake pressure sensor 32, a window actuator 34, a transmission sensor 36, an engine starter 39, a fuel supply shut-off 40, and an other controller 42 connected to the data communications bus 14.

The vehicle control system 10 illustratively includes a remote transmitter 16, and a true controller 18 at the vehicle for controlling the at least one vehicle device via a true command on the data communications bus 14 and based upon signals received from the remote transmitter. Of course in other embodiments, the remote transmitter 16 is not needed, and the true controller 18 controls the at least one vehicle device via a true command on the data communications bus 14. The true command is generated via a true command generator 44 of the true controller 18. The true command generator 44 may be implemented by a software module running on the processor 46, for example, as will appreciated by those skilled in the art.

The true controller 18 also controls the at least one vehicle device via a respective counteracting command on the data communications bus 14 based upon detecting a rogue controller 20 attempt to control the at least one vehicle device via a rogue command on the data communications bus. The counteracting command is generated via a counteracting command generator 48 based upon the rogue controller detector 50 of the true controller 18. The counteracting command may render inoperable the at least one vehicle device for a period of time. The delay may prevent the rogue controller 20 from being successful by repeatedly sending rogue commands as will be appreciated by those skilled in the art.

The rogue controller 20 is illustrated in dotted lines to indicate that it is removably attached to the data communications bus 14. For example, the rogue controller 20 may be attached to the data communications bus 14 by an unauthorized person in an attempt to gain access or control of the vehicle 12. The rogue controller 20 illustratively includes a rogue command generator 60 that generates rogue commands on the data communications bus 14 meant to control the at least one vehicle device.

The processor 46 is connected to the data bus interface 52 that, in turn, connects the processor to the data communications bus 14 as will be appreciated by those skilled in the art. The processor 46 is also illustratively connected to a memory 54 and a receiver 56. The memory may be embedded with the processor 46 in other embodiments.

The receiver 56 wirelessly receives communications from the remote transmitter 16 via the communications link 58. A two-way communications link may also be provided so that the user may receive remote alarms or status information. The remote transmitter 16 maybe a small portable device carried by the user when away from the vehicle, may be a cell tower and related infrastructure, or may be a passive transponder activated at the vehicle.

In an alternate class of embodiments, the receiver is not directly connected to the processor 46. Instead, the receiver 56 may be connected to the logic block 62, and a data bus interface 64 as will be appreciated by those skilled in the art. In other words, the receiver 56 can communicate with the processor 46 over data communications bus 14.

Figure 2:
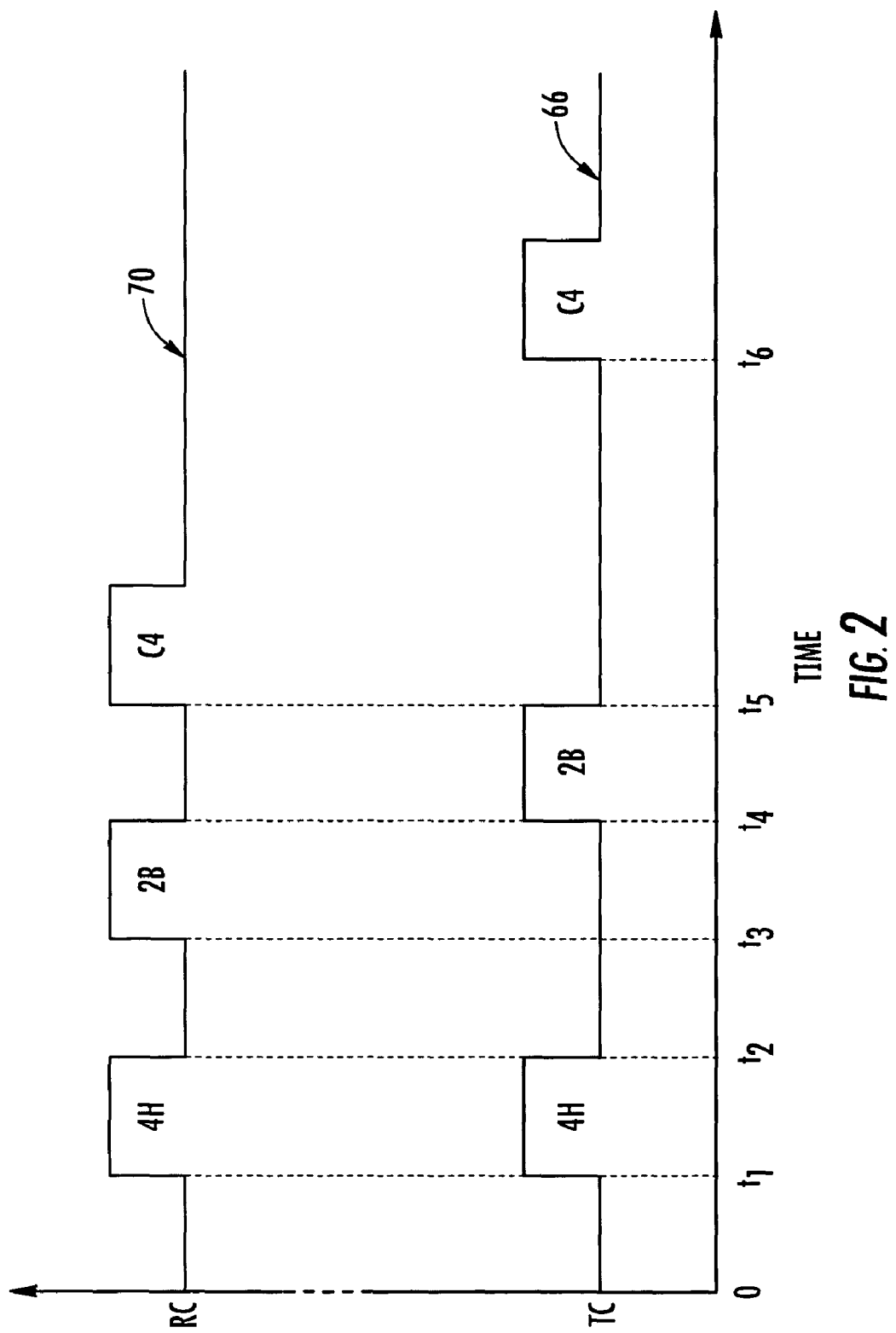
FIG. 2 is a comparison of command code timing and content diagrams as may be used by the vehicle control system shown in FIG. 1.
Figure 3:
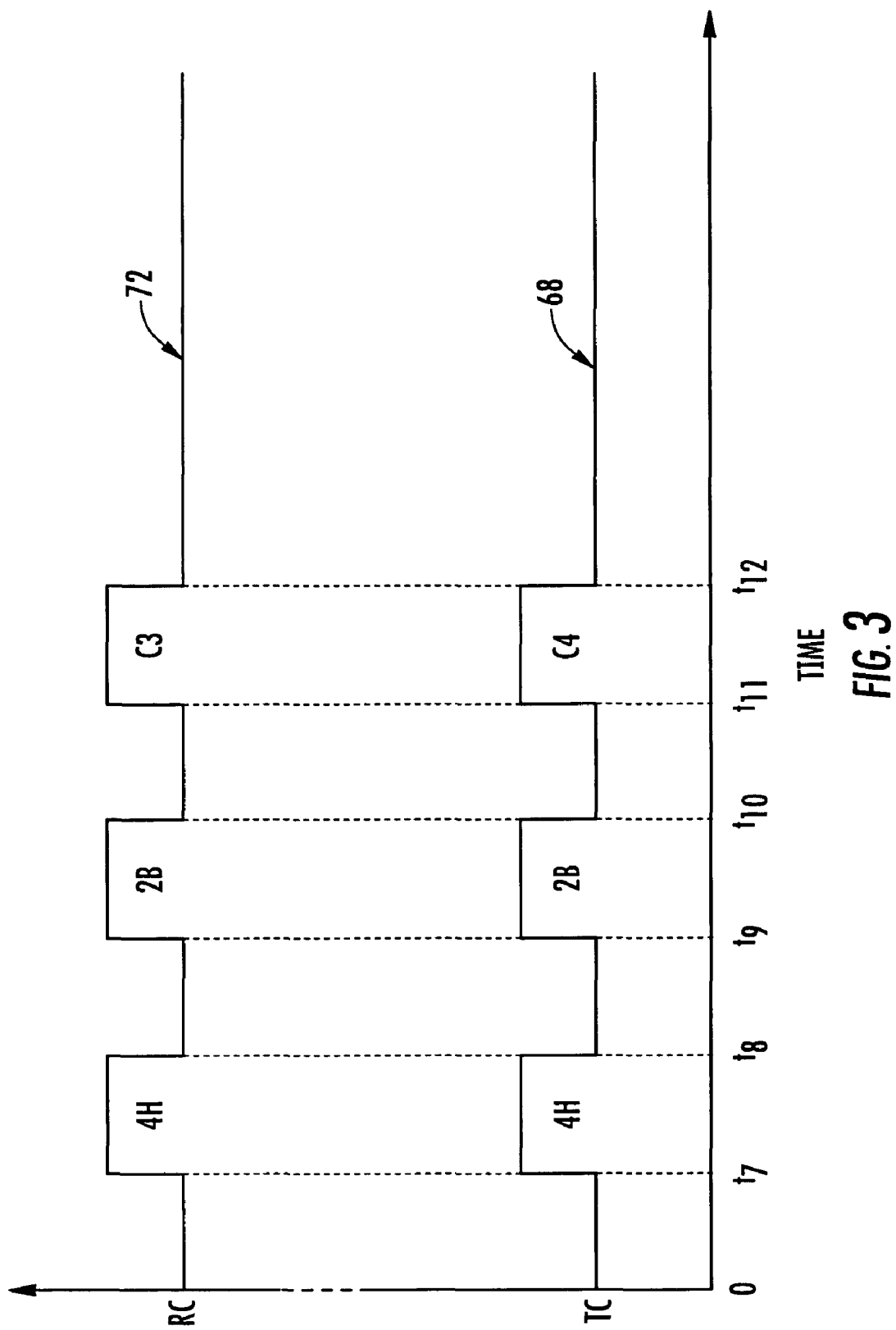
FIG. 3 is a comparison of command code timing and content diagrams as may be used by the vehicle control system shown in FIG. 1.

Turning now additionally to FIGS. 2 and 3, embodiments of operation of the true controller 18 are further described. The true command in each figure illustratively includes a respective sequence of true command codes 66, 68 and the rogue command in each figure includes a respective sequence of rogue command codes 70, 72. The true controller 18 detects the rogue controller 20 attempt based upon at least one difference between the sequence of true command codes 66, 68 and the sequence of rogue command codes 70, 72.

In one class of embodiments, the true controller 18 may detect the rogue controller 20 attempt based upon a difference in timing between the sequence of true command codes 66 and the sequence of rogue command codes 70 (FIG. 2). For example, the detector module 50 monitors command codes on the data communications bus 14 and compares them to a copy of the true command codes 66 stored in the memory 54. At time $t_1$ the rogue controller detector 50 detects a command code entered onto the data communications bus 14 and begins to compare the command code to the copy of the command codes 66 stored in memory 54. At time $t_3$ the rogue controller detector 50 determines a difference between the stored copy of the true command codes 68 and the now identified rogue command codes 70, which causes the counteracting command generator 48 to generate a counteracting command on the data communications bus 14.

In another class of embodiments, the true controller 18 may detect the rogue controller 20 attempt based upon a difference in content between the sequence of true command codes 68 and the sequence of rogue command codes 72 (FIG. 3). At times $t_8$ and $t_{10}$ the rogue controller detector 50 has examined the contents of the command codes 72 and has found the content, the hexadecimal values 4H and 2B, to match the stored true command codes 68. At time $t_{12}$ the rogue controller detector 50 has determined that the rogue command codes 72 does not match the stored true command codes 68, that is, C3 is not C4. The counteracting command generator 48 generates a counteracting command on the data communications bus 14 in response.

In yet other embodiments, the true controller 18 may use differences in both time and content between the sequence of true command codes and the sequence of rogue command codes to detect a rogue controller 20 attempt. The true controller 18 may also include at least one dummy code in the sequence of true command codes. The dummy code does not cause any vehicle function, but is used by the true controller 18 as another marker with which to identify a rogue command code sequence as will be appreciated by those skilled in the art. In its simplest version, the true controller 18 may need a command on the data bus when the true controller itself recognizes that it did not send the command.

The counteracting command is based upon what vehicle device the rogue controller 20 attempts to control. For instance, the at least one vehicle device may be associated with engine starting, and the true controller 18 generates an engine shutdown command as the counteracting command. The vehicle 12 may further comprise an engine speed sensor 24, and the true controller 18 cooperates with the engine speed sensor to detect the rogue controller 20 attempt. The vehicle 12 may further comprise an ignition switch sensor 22, and the true controller 18 cooperates with the ignition switch sensor to detect the rogue controller 20 attempt as will be appreciated by those skilled in the art. In other words, the rogue controller detector 50 may indirectly detect the rogue controller command if the engine is running, but the ignition is not switched on.

In yet other embodiments, the at least one vehicle device may be associated with vehicle door lock actuation, and the true controller 18 may generate a door lock command as the counteracting command. The at least one vehicle device may be associated with vehicle window actuation, and the true controller 18 may generate a window roll-up command as the counteracting command. In yet other embodiments, the at least one vehicle device may be associated with vehicle security, and the true controller 18 may generate a re-arm vehicle security command as the counteracting command.

Those skilled in the art will appreciate the applicability of this detection and the counteracting approach for the remote vehicle control functions, as well. Indeed these concepts may be used by automotive manufacturers to discourage the aftermarket installation of improper remote control systems. Of course, overall vehicle security is also greatly enhanced as will be appreciated by those skilled in the art.

Figure 4:
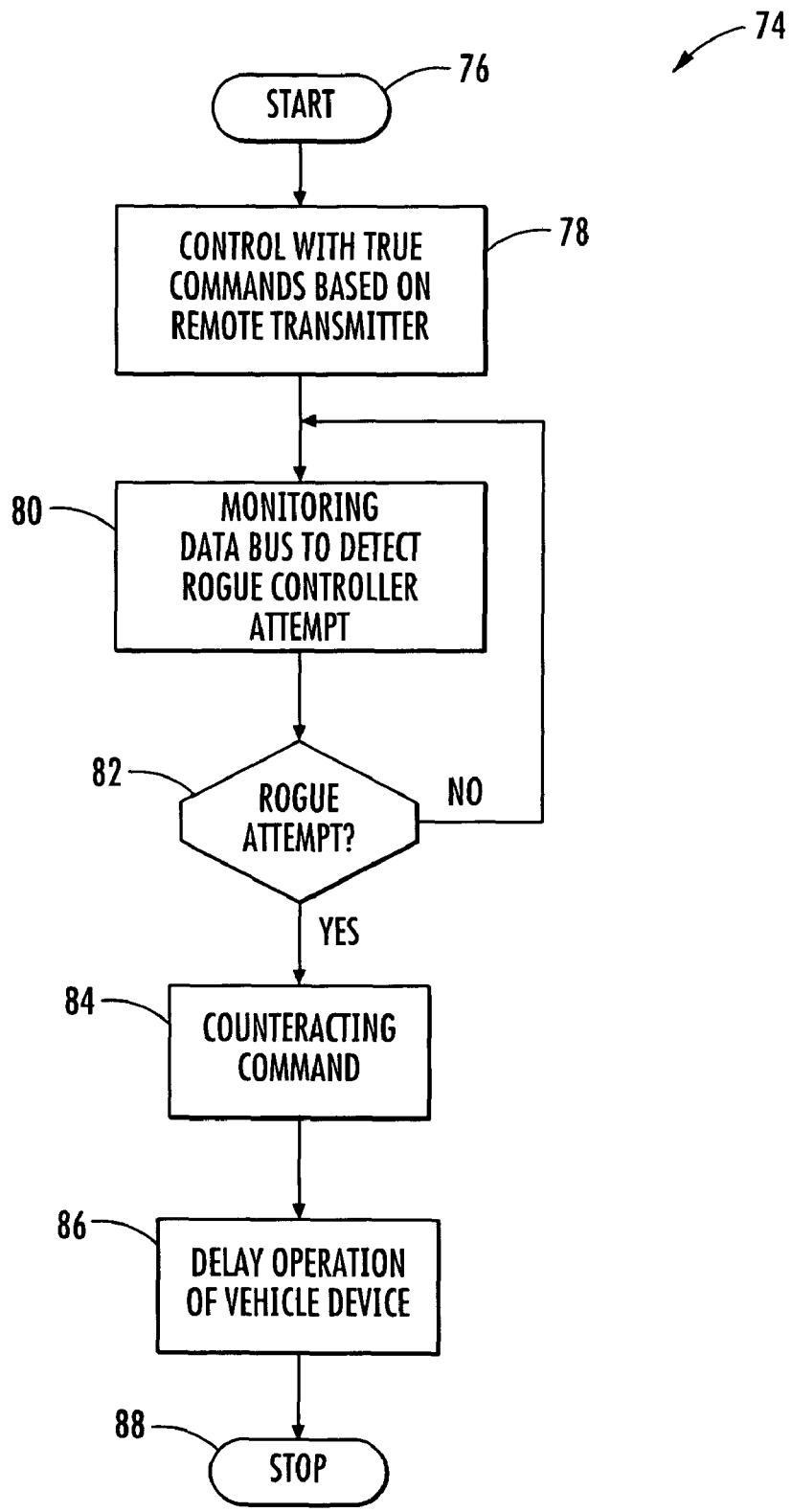
FIG. 4 is a flowchart illustrating a method according to the invention.

A method aspect of the invention is for using a vehicle control system for a vehicle as now explained with additional reference to the flowchart 74 of FIG. 4. As explained in detail above, the vehicle includes a data communications bus extending throughout the vehicle, a true controller connected to the data communications bus, and at least one vehicle device connected to the data communications bus, for example. The method starts at Block 76 and includes controlling the at least one vehicle device via a true command on the data communications bus, such as based upon the remote transmitter (Block 78). The data communications bus is monitored to detect a rogue controller attempting to control a vehicle device over the data communications bus at Block 80. If a rogue controller attempt is detected at Block 82, then the at least one vehicle device is controlled via a respective counteracting command on the data communications bus at Block 84. In addition, the counteracting command can delay the operation of the vehicle device for a period of time at Block 86, before stopping at Block 88.

In addition, other features relating to the vehicle control system are disclosed in a co-pending patent application assigned to the assignee of the present application entitled REMOTE VEHICLE CONTROL SYSTEM AND ASSOCIATED METHOD FOR COUNTERACTING ROGUE COMMAND, Ser. No. 11/000,159, the entire disclosure of which is incorporated herein in its entity by reference. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A vehicle control system for a vehicle comprising a data communications bus extending throughout the vehicle, and at least one vehicle device connected to the data communications bus, the vehicle control system comprising:
   a true controller at the vehicle for controlling the at least one vehicle device via a true command on the data communications bus;
   said true controller also controlling the at least one vehicle device via a respective counteracting command on the data communications bus based upon detecting a rogue controller attempt to control the at least one vehicle device via a rogue command on the data communications bus.

2. The vehicle control system according to claim 1 wherein the counteracting command renders inoperable the at least one vehicle device for a period of time.

3. The vehicle control system according to claim 1. wherein the true command comprises a sequence of true command codes; wherein the rogue command comprises a sequence of rogue command codes; wherein said true controller detects the rogue controller attempt based upon at least one difference between the sequence of true command codes and the sequence of rogue command codes.

4. The vehicle control system according to claim 3 wherein said true controller detects the rogue controller attempt based upon a difference in timing between the sequence of true command codes and the sequence of rogue command codes.

5. The vehicle control system according to claim 3 wherein said true controller detects the rogue controller attempt based upon a difference in content between the sequence of true command codes and the sequence of rogue command codes.

6. The vehicle control system according to claim 1 wherein the at least one vehicle device is associated with engine starting; and wherein said true controller generates an engine shutdown command as the counteracting command.

7. The vehicle control system according to claim 6 wherein the vehicle further comprises an engine speed sensor; and wherein said true controller cooperates with the engine speed sensor to detect the rogue controller attempt.

8. The vehicle control system according to claim 6 wherein the vehicle further comprises an ignition switch sensor; and wherein said true controller cooperates with the ignition switch sensor to detect the rogue controller attempt.

9. The vehicle control system according to claim 1. wherein the at least one vehicle device is associated with vehicle door lock actuation; and wherein said true controller generates a door lock command as the counteracting command.

10. The vehicle control system according to claim 1 wherein the at least one vehicle device is associated with vehicle window actuation; and wherein said true controller generates a window roll-up command as the counteracting command.

11. The vehicle control system according to claim 1 wherein the at least one vehicle device is associated with vehicle control; and wherein said true controller generates a re-arm vehicle control command as the counteracting command.

12. The vehicle control system according to claim 1 wherein said true controller comprises a processor.

13. A vehicle control system for a vehicle comprising a data communications bus extending throughout the vehicle, and at least one vehicle device associated with engine starting connected to the data communications bus, the vehicle control system comprising;
   a true controller at the vehicle for
      controlling the at least one vehicle device via a true engine start command on the data communications bus,
      controlling the at least one vehicle device via a respective Counteracting engine shutdown command on the data communications bus based upon detecting a rogue controller attempt to control the at least one vehicle device via a rogue engine start command on the data communications bus, and
      rendering inoperable the at least one vehicle device for a period of time with the counteracting engine shutdown command.

14. The vehicle control system according to claim 13 wherein the true engine start command comprises a sequence of true engine start command codes; wherein the rogue engine start command comprises a sequence of rogue engine start command codes; wherein said true controller detects the rogue controller attempt based upon at least one difference between the sequence of true engine start command codes and the sequence of rogue engine start command codes.

15. The vehicle control system according to claim 14 wherein said true controller detects the rogue controller attempt based upon a difference in timing between the sequence of true engine start command codes and the sequence of rogue engine start command codes.

16. The vehicle control system according to claim 14 wherein said true controller detects the rogue controller attempt based upon a difference in content between the sequence of true engine start command codes and the sequence of rogue engine start command codes.

17. The vehicle control system according to claim 13 wherein the vehicle further comprises an engine speed sensor; and wherein said true controller cooperates with the engine speed sensor to detect the rogue controller attempt.

18. The vehicle control system according to claim 13 wherein the vehicle further comprises an ignition switch sensor; and wherein said true controller cooperates with the ignition switch sensor to detect the rogue controller attempt.

19. The vehicle control system according to claim 13 wherein said true controller comprises a processor.

20. A vehicle control system for a vehicle comprising a data communications bus extending throughout the vehicle, and at least one vehicle device associated with vehicle door lock actuation connected to the data communications bus, the vehicle control system comprising:
   a true controller at the vehicle for
      controlling the at least one vehicle device via a true door unlock command on the data communications bus,
      controlling the at least one vehicle device via a respective Counteracting door lock command on the data communications bus based upon detecting a rogue controller attempt to control the at least one vehicle device via a rogue door unlock command on the data communications bus, and
      rendering inoperable the at least one vehicle device for a period of time with the counteracting door lock command.

21. The vehicle control system according to claim 20 wherein the true door unlock command comprises a sequence of true door unlock command codes; wherein the rogue door unlock command comprises a sequence of rogue door unlock command codes; wherein said true controller detects the rogue controller attempt based upon at least one difference between the sequence of true door unlock command codes and the sequence of rogue door unlock command codes.

22. The vehicle control system according to claim 21 wherein said true controller detects the rogue controller attempt based upon a difference in timing between the sequence of true door unlock command codes and the sequence of rogue door unlock command codes.

23. The vehicle control system according to claim 21 wherein said true controller detects the rogue controller attempt based upon a difference in content between the sequence of true door unlock command codes and the sequence of rogue door unlock command codes.

24. The vehicle control system according to claim 20 wherein said true controller comprises a processor.

25. A vehicle control system for a vehicle comprising a data communications bus extending throughout the vehicle, and at least one vehicle device associated with vehicle window actuation connected to the data communications bus, the vehicle control system comprising:
   a true controller at the vehicle for
      controlling the at least one vehicle device via a true roll-down command on the data communications bus,
      controlling the at least one vehicle device via a respective counteracting rollup command on the data communications bus based upon detecting a rogue controller attempt to control the at least one vehicle device via a rogue roll-down command on the data communications bus, and
      rendering inoperable the at least one vehicle device for a period of time with the Counteracting roll up command.

26. The vehicle control system according to claim 23 wherein the true roll-down command comprises a sequence of true roll-down command codes; wherein the rogue roll-down command comprises a sequence of rogue roll-down command codes; wherein said true controller detects the rogue controller attempt based upon at least one difference between the Sequence of true roll-down command codes and the sequence of rogue roll-down command codes.

27. The vehicle control system according to claim 26 wherein said true controller detects the rogue controller attempt based upon a difference in timing between the Sequence of true roll-down command codes and the sequence of rogue roll-down command codes.

28. The vehicle control system according to claim 26 wherein said true controller detects the rogue controller attempt based upon a difference in content between the sequence of true roll-down command codes and the sequence of rogue roll-down command codes.

29. The vehicle control system according to claim 25 wherein said true controller comprises a processor.

30. A vehicle control system for a vehicle comprising a data Communications bus extending throughout the vehicle, and at least one vehicle device associated with vehicle control connected to the data communications bus, the vehicle control system comprising:
   a true controller at the vehicle for
      controlling the at least one vehicle device via a true disarm vehicle control command on the data communications bus,
      controlling the at least one vehicle device via a respective counteracting re-arm vehicle control command on the data communications bus based upon detecting a rogue controller attempt to control the at least one vehicle device via a rogue disarm vehicle control command on the data communications bus, and rendering inoperable the at least one vehicle device for a period of time with the counteracting re-arm vehicle control command.

31. The vehicle control system according to claim 30 wherein the true disarm vehicle control command comprises a sequence of true disarm vehicle control command codes; wherein the rogue disarm vehicle control command comprises a sequence of rogue disarm vehicle control command codes; wherein said true controller detects the rogue controller attempt based upon at least one difference between the sequence of true disarm vehicle control command codes and the sequence of rogue disarm vehicle control command codes.

32. The vehicle control system according to claim 31 wherein said true controller detects the rogue controller attempt based upon a difference in timing between the sequence of true disarm vehicle control command codes and the sequence of rogue disarm vehicle control command codes.

33. The vehicle control system according to claim 31 wherein said true controller detects the rogue controller attempt based upon a difference in content between the sequence of true disarm vehicle control command codes and the sequence of rogue disarm vehicle control command codes.

34. The vehicle control system according to claim 30 wherein said true controller comprises a processor.

* * * * *

UNITED STATES PATENT AND TRADEMARK OFFICE
CERTIFICATE OF CORRECTION

PATENT NO. : 7,729,814 B2  Page 1 of 1
APPLICATION NO. : 11/000160
DATED : June 1, 2010
INVENTOR(S) : Flick et al.

It is certified that error appears in the above-identified patent and that said Letters Patent is hereby corrected as shown below:

Column 8, Line 43    Delete: "Sequence"
                     Insert: --sequence--

Signed and Sealed this

Twenty-fourth Day of August, 2010

David J. Kappos
*Director of the United States Patent and Trademark Office*